United States Patent [19]
Allen

[11] 4,207,865
[45] Jun. 17, 1980

[54] PASSIVE SOLAR HEATING DEVICE

[76] Inventor: Reed R. Allen, 825 S. Wolfe Rd., Sunnyvale, Calif. 94086

[21] Appl. No.: 929,509

[22] Filed: Jul. 31, 1978

[51] Int. Cl.² .............................................. F29J 3/02
[52] U.S. Cl. ................................... 126/431; 126/430; 237/2 B
[58] Field of Search .................. 126/271, 430, 431; 231/1 A, 2 B

[56] References Cited
U.S. PATENT DOCUMENTS

| | | | |
|---|---|---|---|
| 3,987,782 | 10/1976 | Meier, Jr. | 165/106 |
| 4,003,367 | 1/1977 | Wikholm | 165/106 |
| 4,050,508 | 9/1977 | Buckley | 165/106 |
| 4,059,094 | 11/1977 | de Mendoza | 126/271 |
| 4,061,129 | 12/1977 | Wilson | 126/271 |
| 4,083,490 | 4/1978 | Cunningham et al. | 126/271 |

FOREIGN PATENT DOCUMENTS 2604361  8/1977  Fed. Rep. of Germany ........... 126/271

*Primary Examiner*—Henry C. Yuen
*Attorney, Agent, or Firm*—Townsend and Townsend

[57] ABSTRACT

Space heating is disclosed which uses solar radiation as a thermal energy source to passively heat spaces within a structure which are substantially remote from direct solar radiation. A device according to the invention includes a radiation target, a closed and sealed circuit path for a fluid, such as a liquid, which is employed to communicate thermal energy from a radiation source to a thermal dissipation sink and a thermal dissipator, all incorporated as elements of a wall module which is adapted to be placed centrally within a structure which may not have a south-facing outer wall. A clerestory generally above the wall module provides a window for solar radiation to the radiation target. The fluid is conveyed by a thermal siphon effect, that is, by fluid convection, in a closed and sealed circuit. A vertical differential is provided within the closed circuit, and a thermal differential between segments of the circuit develops sufficient power to effect fluid circulation.

14 Claims, 4 Drawing Figures

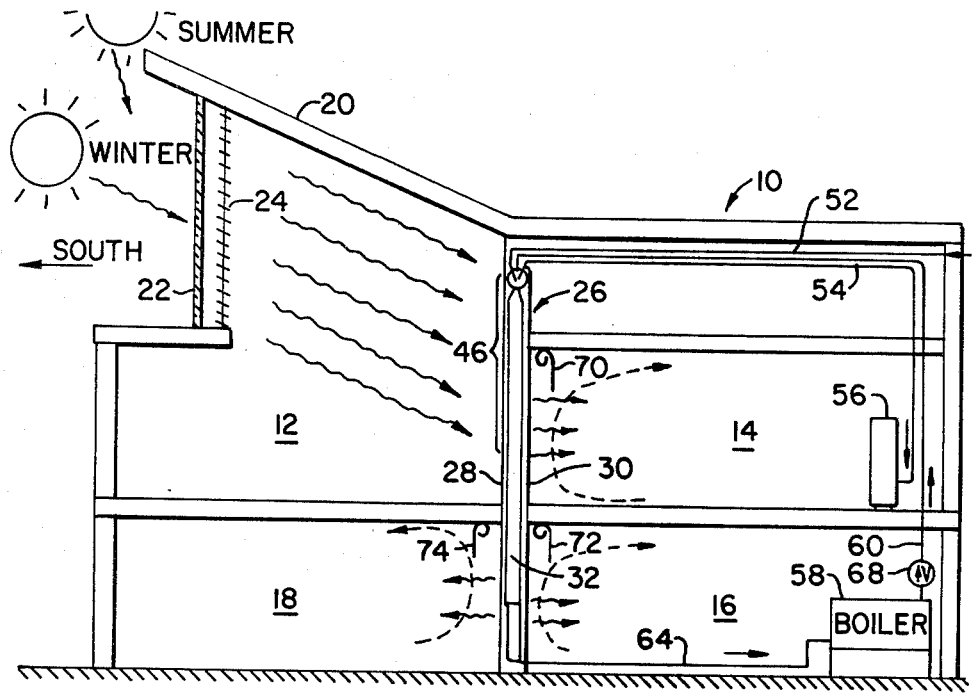
FIG._1A.
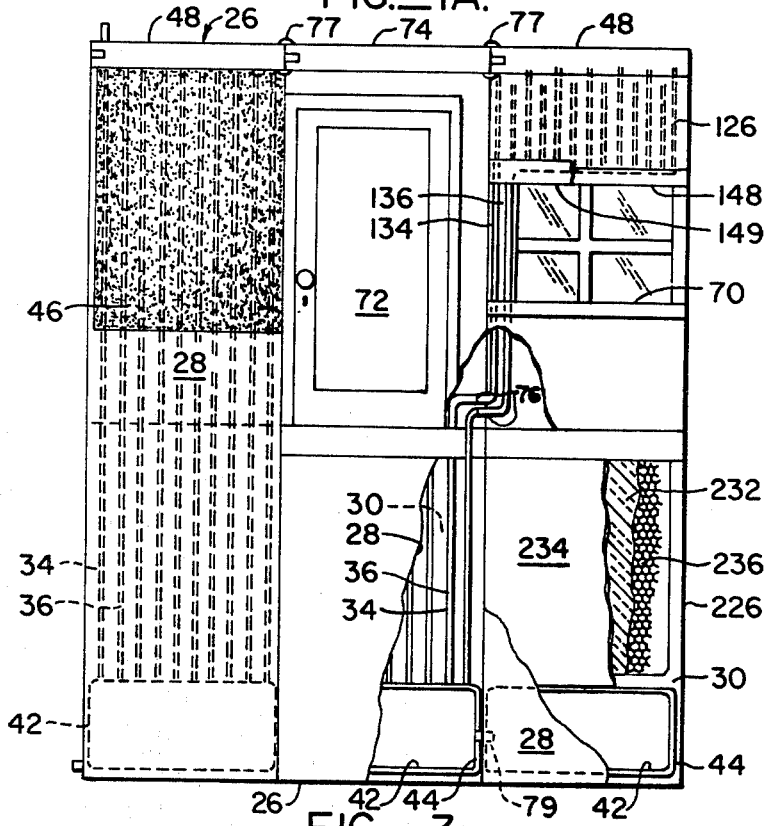
FIG._3.

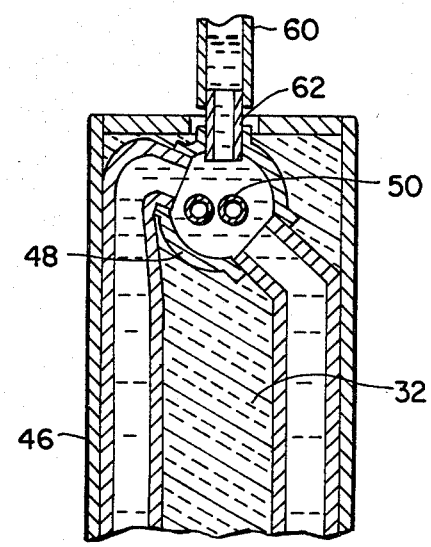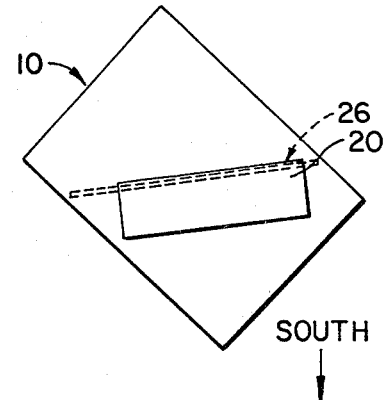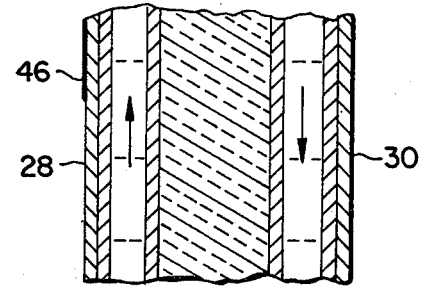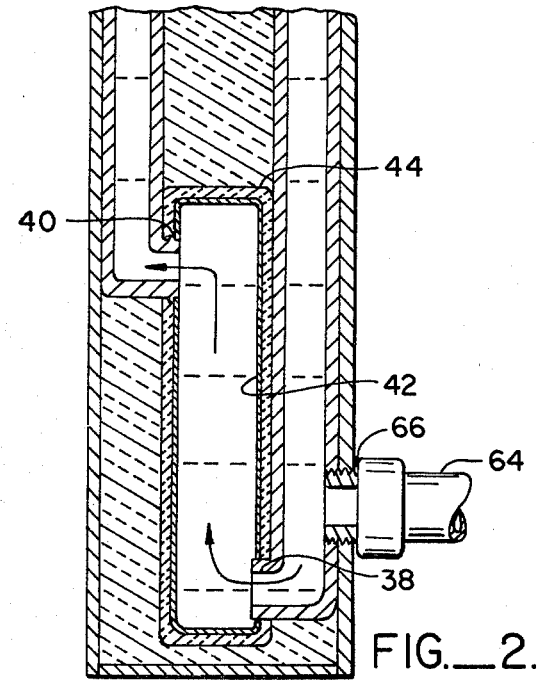
FIG._1B.
FIG._2.

PASSIVE SOLAR HEATING DEVICE

BACKGROUND OF THE INVENTION

1. Field of Invention

This invention relates to solar heating systems for interior portions of structures and in particular discloses a solar heating system employing a thermal siphon effect. By passive system, it is meant a system devoid of externally powered fluid pumping means, such as electrically powered pumps for circulating fluid.

2. Description of the Prior Art

Solid wall solar heating and storing devices are well-known. The classic Trahmbé Wall is well-known. The Trahmbé Wall is typically a solid structure of large mass which absorbs solar radiation on one face during daylight storing heat in the mass, and during darkness dissipating the heat through the opposing face into an enclosure.

Also well-known to the art is the thermal siphon comprising a boiler coupled in a closed circuit to a radiator. The thermal siphon is a passive system, that is, it is a system which does not employ an externally powered pump to circulate the fluid. The only energy input is through the heat supplied to the fluid in the boiler.

A need exists to provide a passive heating system for receiving solar radiation, storing heat so generated, and supplying the heat for space heating. In paticular, there is a need for a passive system which can be modularized and easily installed in a building.

SUMMARY OF THE INVENTION

According to the invention, a space heater and a method for space heating are disclosed which employ solar radiation as a thermal energy source to passively heat spaces within a structure which are substantially remote from direct solar radiation.

A device according to the invention comprises a sealed circuit path for a fluid, such as a liquid, which is employed to communicate thermal energy from a radiation source or target to a thermal dissipation sink or radiating surface. The fluid, which may be water or a eutectic liquid such as propylene glycol, is heated at the radiation target and conveyed by a thermal siphon effect, that is by fluid convection, around the closed and sealed circuit. A vertical differential is provided within the closed circuit, and a thermal differential is developed between the radiation source and the dissipation sink which is sufficient to develop power to effect the fluid circulation.

In particular, the device is embodied in a modular wall segment having a radiation absorbing surface on only one face, and wherein the other faces are thermal dissipators. Essential to the operation of the invention is thermal insulation between the segments of the closed circuit. The thermal insulation may be a partition centrally located within the wall, one side of the partition having risers in thermal contact with the radiation absorbing face and the other side of the partition having downcomer pipes in thermal contact with a thermal dissipating face.

The risers and downcomers are connected in a closed circuit through a thermally insulated reservoir for storing the fluid. The reservoir is preferably located within the wall module. To optimize thermal storage, the reservoir may be located near the top of the module at the output of the risers from the radiation absorbing surface. The reservoir may also be located in or along the base of the module to lower its center of gravity.

The module is particularly suited for installation as a wall module centrally within a structure without disturbing the location or orientation of the outside walls. According to the invention, a structure is provided with a clerestory having a window permitting solar radiation to impinge upon the radiation abosrber of the device, where the device is centrally located within the structure. The structure may be a two-story building with spaces or rooms to be heated abutting the device. The device may extend the height of two stories. Since the device is modular, and since it is located centrally within the structure, it can radiate heat from opposing faces to easily heat adjacent spaces.

It is an object of the invention to provide a solar radiation-excited thermal-siphon space heating device incorporated within a wall.

It is a further object of the invention to provide a solar heating device which can be centrally located within a structure.

It is a still further object of the invention to provide a modular solar heating device which can be centrally located within a building having random orientation or without a south-facing outer wall exposed to solar radiation.

It is a still further object of the invention to provide a modular passive solar heating system, that is a solar heating system without the use of externally powered fluid pumping means.

These and other objects of the invention will be best understood by reference to the following detailed description taken together with the accompanying drawings.

BRIEF DESCRIPTION OF THE DRAWINGS

FIG. 1A is a side elevational view of a structure in partial schematic illustrating the functional elements of the invention.

FIG. 1B is a top plan view of FIG. 1A. FIGS. 1A and 1B are referred to collectively as FIG. 1.

FIG. 2 is a side cross-sectional view of a wall module according to the invention.

FIG. 3 is a front elevational view illustrating various wall modules which are constructed according to the invention.

DETAILED DESCRIPTION OF PREFERRED EMBODIMENTS

FIGS. 1A and 1B depict a structure 10 according to the invention comprising a plurality of rooms 12, 14, 16 and 18, and a clerestory 20 with a south-facing window 22. Adjustable louvers 24 may be provided to regulate the radiation through the window 22. The angle of the clerestory 20 roof is selected to provide maximum radiation through the window 22 during the winter while at least partially shading the building interior during the summer months. At a latitude for San Francisco, 38° N. Lat., the angle of the roof for midday sun on the first day of winter is about 23°. The midday summer sun is considerably higher, namely about 76° on the first day of summer.

Centrally located and disposed on an east-west axis with a south-facing vertical face aligned with the midday sun is a space heating device 26 according to the invention. The outer walls of the structure 10 may have a random orientation to the midday sun, as is depicted in FIG. 1B. The device 26 comprises first and second rigid outer membranes 28 and 30 which serve as wall faces, a central insulating core 32, and a fluid path surrounding the core 32. The fluid path may comprise pipes or thin sheet-like chambers as hereinafter described. In addition, there is a target area for the solar radiation, and typically near the top of the first membrane 28.

Turning to FIG. 2, there is shown in greater detail the device 26 constructed as a wall module. The circuit path comprises riser pipes 34 and downcomer pipes 36 disposed on opposing sides of the core 32. The riser pipes 34 and downcomer pipes 36 are provided with means 38 and 40 for coupling to a storage unit, such as a reservoir 42 integrally contained within the device 26. The coupling means 38 and 40 may be suitable pipe couplings adapted for sealed connection with the reservoir inlets and outlets respectively. The reservoir 42 is provided with a thermal insulative blanket 44 to insulate against thermal dissipation. The reservoir may be located within the device 26 adjacent its bottom margin. Where the reservoir 42 is located adjacent the bottom margin, the output coupling means 40 of the downcomer pipe 36 are preferably connected adjacent the bottom margin of the reservoir 42, and the input coupling means 38 of the riser pipes 34 are preferably coupled to the reservoir 42 higher than the outlet means 38.

The wall membranes 28 and 30 are preferably thermally conductive material such as aluminum or similar rigid sheet material. The riser pipes 34 are in intimate thermal contact with the first membrane 28, and the downcomer pipes 36 are in intimate thermal contact with the second membrane 30 on the opposing face of the device 26. To effect the intimate thermal contact, a thermally conductive grease may be interposed between the pipes and the membranes 38 and 40.

The first membrane 28 is provided with a radiation absorption means 46 in the radiation target area. The radiation absorbing means 46 may be a coating of flat black paint on the surface of the membrane 28 which serves as a black body absorber to absorb solar radiation and to convert it to thermal energy which may be conveyed through the conductive membrane 28 to the riser pipe 34. The riser pipes 34 may be connected to a header 48 horizontally disposed across the top of device 26. The header 48 is also coupled to the downcomer pipes 36 along the opposite side of the core 32. The remaining surfaces of the membranes 28 and 30 may be painted or coated with a material which enhances radiation. This includes any light-colored paint such as white, beige, tan, and olive. Exposed embossed metallic surfaces are superior radiators but are becoming unacceptable as an interior wall covering.

The method of the invention can now be explained. Referring to FIGS. 1 and 2, the fluid circuit is filled with a fluid, such as a liquid including water or a eutectic liquid such as propylene glycol. Radiation from the sun is directed to impinge upon the radiation absorbing means 46, causing the membrane 28 thereunder to heat and to conduct the thermal energy to the riser pipes 34. The thermal energy so conducted causes the fluid in the abutting riser pipes 34 to heat, convectively rising toward the apex of the circuit in header 48. A positive thermal differential between the fluid in downcomer pipes 36 and adjacent space abutting the radiation surfaces of membranes 28 and 30 causes heat to be dissipated into that space. The space is heated by conduction, convection and also by radiation. The heat so dissipated causes a thermal differential across the insulative core 32 to create fluid convection around the circuit path and through the reservoir 42. The thermal energy is dissipated in all areas of the circuit path where there is a positive thermal differential between the fluid and the adjacent air space through the membranes 28 and 30.

The zone comprising the heat absorbing means 46 and riser pipes 34 adjacent the heat absorbing means may be termed the first or energy receiving zone. All other zones of the circuit providing a path for thermal dissipation comprise a second or thermal dissipating zone.

Referring again to FIGS. 1 and 2, the header 48 may serve as a heat exchanger. In particular, a U-tube 50 may be provided within the header 48 to provide a path 52, 54 to preheat water supplied to a hot water heater 56.

Additionally, the device 26 may be provided with a backup system for supplying heat to the fluid in the device 26 during periods of minimal radiation input. The backup system may comprise a boiler 58 (FIG. 1) coupled through an inlet line 60 to inlet means 62 (FIG. 2) at the top of the device 26 and having a return line 64 (FIG. 1) coupled to outlet means 66 near the bottom of the fluid circuit. A one-way valve 68 (FIG. 1) in the inlet line 60 may be provided to prevent backflow of fluid into the boiler which might prevent proper circulation of the solar heated fluid in the device 26. Alternatively, the boiler 58 and its circuit could be decoupled by one or more stop valves from the device 26. The boiler 58 also operates on a thermal siphon principle, that is, devoid of any external fluid pumping means in the circuit.

Referring again to FIG. 1, there are shown a plurality of blinds 70, 72, and 74. These blinds may be disposed in front of the device 26 and across its entire width to modulate the amount of thermal dissipation from the dissipating surfaces. In this manner, the heat radiated to each of the rooms 14, 16 is inexpensively moderated. The room 12 adjacent the radiation absorbing means 46 is generally designated as a nighttime sleeping area. During the daytime it receives direct radiation from the clerestory, and at night it receives heat through dissipation as do the other rooms 14, 16 and 18 although to a lesser degree due to the presence of the absorbing means 46 on the adjacent wall portion of the device 26.

The fluid reservoir 42 may also be located adjacent the upper portion of the wall module, and in fact the header 48 shown in FIG. 2 may also serve as a heat storage reservoir to the extent it is thermally insulated. In the case the reservoir 42 is disposed at the top of the device 26, the inlet should be provided above the outlet, as is shown in FIG. 2.

Referring now to FIG. 3, a number of alternative embodiments of the invention are shown. Device 26 as described hereinabove is shown to the left of FIG. 3 and at the bottom center of FIG. 3. The wall module is approximately 36 inches wide and may extend two stories (as in the left side) or one story (as shown in the lower center side). The riser and downcomer pipes 34 and 36 may be one-half inch metal pipes spaced approximately four inches apart along the inner surfaces of the membranes 28 and 30. The reservoir 42 is disposed at the bottom of the module and is surrounded by insulative blanket 44. The radiation absorption means 46 is provided on the outer surface of the membrane 28 adjacent the upper margin so that it is in full confrontation with radiation through clerestory 20 (FIG. 1).

Various adaptations may be made. For example, a provision may be made within a module 126 to receive a window 70, as shown to the upper center of FIG. 3. For this purpose, auxiliary risers 134 and downcomers 136 are required to bypass the space for the window 70 and a first intermediate header 148 and second intermediate header 149 are provided to collect fluid for the bypass. Space may also be provided for a door 72 between modules by providing a header bridge 74 across the top of the door, as shown in the upper center of FIG. 3. Quick connect fluid couplings may be provied between reservoirs 42 and downcomer pipes 36 with sealed couplings 76. In addition, quick connect sealed fluid couplings 77, 79 may be provided between adjacent headers 48 and also bridge 74 as well as between adjacent reservoirs 42 of abutting modules. The connectors 77, 79 may be similar to the Ring-Tite quick connect couplings manufactured by Johns-Manville Pipe Division, Stockton, Calif.

FIG. 3 in the lower right-hand corner shows a further alternative embodiment. There is depicted a device 226 according to the invention wherein the fluid is stored and conveyed in sheet-like chambers 234 (for rising fluid) and 236 (for falling fluid). The chambers 234, 236 may have corrugated or lattice interior structures to prevent buckling.

While metal is preferred for its heat conductive properties and high temperature resistance, still other materials may be employed in the circuit path. For example, UPVC (unplasticized Poly Vinyl Chloride) and some thermosetting plastics having high heat resistance and high resistance to warp at relatively high temperatures (above 250° F.) might be employed as a wall material. The structure and elements of the structure could be extruded to the desired shape to achieve economies in construction of modular units.

The fluids best suited for use in the invention, and comprising an element of the invention in particular embodiments, include water, eutectic mixtures such as propylene glycol and water, liquid fluorocarbons, alcohols, glycols, salt waters, lithium chloride and metal which are liquid at the working temperatures, such as mercury. Mercury has the advantage of an extremely high heat capacity. However, its expense probably makes it prohibitive in practical applications of the invention.

The invention has now been explained with reference to particular embodiments. Other embodiments will be apparent to those of ordinary skill in the art with reference to this disclosure, including Specification and drawings. It is therefore not intended that the invention be limited except as indicated by the appended claims.

I claim:

1. An enclosable structure having an interior passive solar space heating system comprising:
   a partition wall comprising a device separating at least two rooms on each of a first story and a second story, said device comprising
   (a) means for absorbing direct solar radiation as thermal energy;
   (b) means for dissipating thermal energy to said at least two rooms;
   (c) a fluid circuit line having a vertical path differential, said circuit line being adapted to be filled with a fluid, said circuit line comprising a first segment abutting to said radiation absorbing means for absorbing thermal energy from said radiation absorbing means into fluid contained within said first segment, and a second segment abutting to said thermal energy dissipating means and adapted to dissipate thermal energy from fluid contained within said segment to said thermal energy dissipating means, said fluid circuit line being operative as path for flow of fluid by thermal convection between said first segment and said second segment upon the establishment of a thermal differential between fluid-containing segments; and
   (d) means for thermally insulating said radiation absorbing means and said first segment from said thermal energy dissipating means and said second segment, wherein said insulating means comprises a planar partition abutted between said first segment and at least a portion of said second segment and wherein said absorbing means further comprises a sheet of substantially rigid thermally conductive material having a radiation absorptive surface adapted to be oriented to receive impinging solar radiation for promoting the establishment of said thermal differential;
   a fluid adapted for convection in said circuit line of said device;
   a thermally insulated fluid resevoir sealably coupled in said circuit path of said device for storing a portion of said fluid; and
   a clerestory disposed above said second story, said clerestory having a window, said window being disposed at such a location to permit impingement of solar radiation upon said radiation absorption means such that thermal energy may be dissipated from said device after absorption of radiant energy through said clerestory.

2. A structure according to claim 1 wherein a roof of said clerestory is disposed at such an angle to maximize impingement of solar radiation upon said radiation absorption means during winter season.

3. A structure according to claim 2 wherein said clerestory and said radiation absorption means are disposed at such a location relative to the path of the sun to maximize impingement of solar radiation upon said radiation absorption means at midday.

4. A device according to claim 1 further including means for modulating at least a portion of the thermal energy dissipation from said thermal energy dissipating means, said modulating means comprising a thermal barrier adapted to be selectively disposed between said remote space and at least a portion of said energy dissipating sheet.

5. A device according to claim 4 wherein said thermal barrier further comprises a membrane adapted to be disposed a selected distance from said sheet portion in manner to establish a substantially stationary enclosure containing air adjacent said sheet portion.

6. A device according to claim 1 wherein said fluid circuit line is adapted to contain a liquid as a thermal convection medium.

7. A device according to claim 1 wherein said fluid circuit line is adapted to contain a eutectic liquid as a thermal convection medium.

8. A device according to claim 7 wherein the liquid is propylene glycol and water.

9. A device according to claim 1 wherein said circuit is adapted to contain a liquid as a thermal convection medium, said liquid being selected from the group consisting of water, liquid fluorocarbons, alcohols, glycols, eutectic mixtures of glycols, salt waters, lithium chloride and mercury.

10. A device according to claim 1 wherein said thermal insulating means further comprises a horizontally disposed header along the top margin of said partition, and wherein said first segment comprises a plurality of vertically disposed riser pipes along a first face of said partition and connected to said horizontal header, and wherein at least a portion of said second segment comprises a plurality of vertically disposed downcomer pipes disposed along a second face of said partition on the side opposing said first face and connected to said header.

11. A device according to claim 10 wherein said reservoir is disposed adjacent the bottom margin of said partition and wherein said downcomer pipes include outlet means disposed adjacent the lowest point of said reservoir.

12. A device according to claim 10 wherein said header further comprises an outer tube connected to said fluid circuit line and an inner tube sealed from said outer tube and having an inlet means and an outlet means adapted for connecting to a domestic water supply for preheating said water supply.

13. A device according to claim 10 further including means for coupling a further sealed fluid heating device into said circuit line, said device coupling means including an inlet port at the highest point of said device and an outlet port at the lowest point of said device.

14. A device according to claim 13 further comprising a further sealed fluid heating device, said further device having an outlet line sealed to said inlet port and an inlet line sealed to said outlet port, a fluid heater coupled at an inlet means to said inlet line for receiving thermally energy dissipated liquid and outlet means coupled to said outlet line and disposed above said inlet means for supplying fluid having increased thermal energy content, said further heating device being devoid of externally powered fluid pumping means and adapted to convey said fluid by thermal convection through said second segment upon establishment of a thermal differential between said inlet means and said outlet means.

* * * * *